Patented Nov. 25, 1930

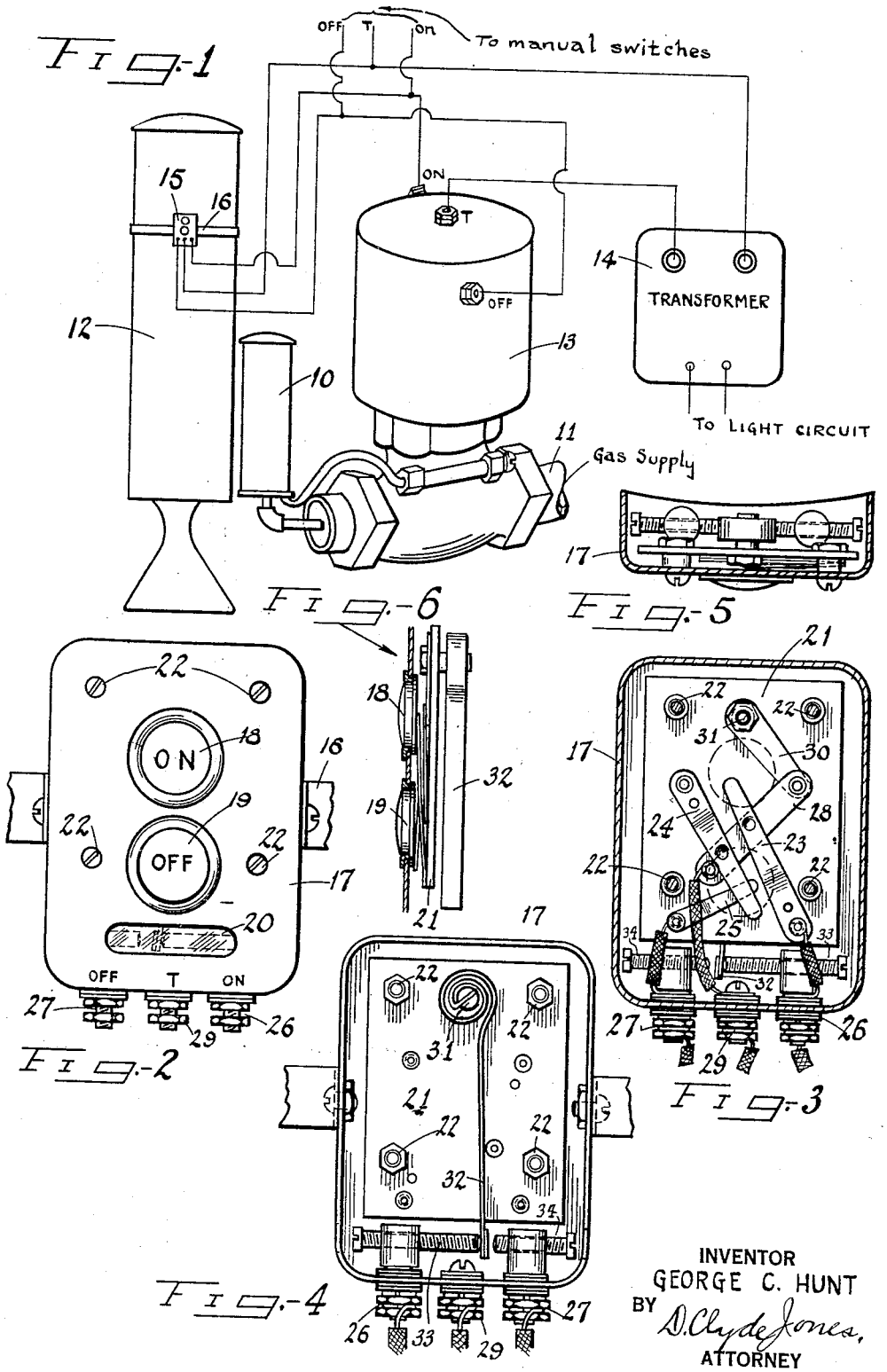

1,782,653

UNITED STATES PATENT OFFICE

GEORGE C. HUNT, OF ROCHESTER, NEW YORK, ASSIGNOR TO THE SAVUTIME DEVICES, INC., OF ROCHESTER, NEW YORK, A CORPORATION OF NEW YORK

CONTROL DEVICE FOR HEATING SYSTEMS

Application filed November 4, 1927. Serial No. 231,054.

This invention relates to gas or electric heating systems and more particularly to means for controlling gas or electric heaters utilized in water heating systems.

In certain kinds of hot water systems where gas is used for heating, it is customary to place an electromagnetically controlled valve in the gas supply pipe to the burner of the type that when energized over one circuit opens the gas supply line and when actuated over another circuit cuts off the gas supply. A pilot light for lighting the burner when the gas is turned on burns continually and is supplied with fuel through a by-pass connection from the pilot light to the gas supply independent of the valve. The control circuits for operating the valve are arranged to be energized from the electric lighting circuit or other source of current, when suitable manual switches located in convenient parts of the building, are operated to close the circuits. As a precautionary measure a thermostat or suitable heat-controlled switch is placed on the hot water tank so that when the water therein has reached a predetermined temperature, the switch operates the electromagnetically controlled valve to cut off the gas supply.

Where electricity is used for heating the water instead of gas it is only necessary to remove the gas burner and the gas line having the electromagnetically controlled valve therein, and to substitute an electric heating element connected to electric power leads provided with an electromagnetic switch of the type employed in gas systems except that it differs therefrom merely in substituting a switch for the gas valve.

In such former systems it has been the practice to have all of the manual switches mounted at a distance from the hot water heater and this was true even when one of these switches was located on the same floor as the heater.

In accordance with the present invention it is proposed to simplify the control of the heating system and to combine one of the manual switches with the thermostat or heat-controlled switch and thereby reduce the number of pieces of equipment and the amount of wiring necessary in an installation with the resultant reduction in cost.

Referring to the drawings, Fig. 1 represents a diagrammatic view of a portion of an installation in which the present invention is incorporated and in which certain of the pieces of apparatus are shown exaggerated in size to facilitate understanding thereof. Fig. 2 is a front view of the combined heat-controlled and manually controlled switch for use in the system of Fig. 1, and Fig. 3 is a front view of this switch structure with the front of the outer casing cut away. Fig. 4 is a rear view of the switch structure while Fig. 5 is a horizontal sectional view thereof taken on Fig. 2 and Fig. 6 is a detail of the push puttons and the springs of the manual switches.

Referring to the system shown in Fig. 1, 10 indicates a water heater heated by gas from a gas supply line 11, which heater is connected in the well-known manner through pipes (not shown) to the water supply line and to a hot water storage tank 12. For controlling the supply of gas to this heater there is provided in the pipe between the gas supply and the heater, an electromagnetic valve generally designated 13, by which the supply of gas is controlled either to furnish gas to the burner or to cut it off completely. This valve is connected in control circuits to convenient parts of the building where there are provided suitable manual switches (not shown), for cutting on and off the supply of gas as desired, and derives its energizing current from the electric lighting conductors through a transformer such as 14 of the bell-ringing type or from any other suitable current source.

It has been customary in former installations even when one of the manual switches was located on the same floor as the heater to mount this manual switch at a point remote from the hot water heater, an arrangement which has resulted in the need for an additional manual switch and also additional wiring for connecting it into the system. It has also been the practice to mount a thermostat on the storage tank and connect it into the control circuits to turn off the valve when a predetermined amount of water has been heated. In accordance with the present invention it is proposed to combine the thermostat switch and the manual switch into a structure shown at 15 and to mount the resultant structure on the storage tank 12 by a clamping band 16 surrounding the tank. This structure as shown in Fig. 2 consists of a rectangular casing 17 open at its rear side as shown in Fig. 4. The front of the casing has two circular openings in which there are mounted two insulating push buttons 18 and 19 and a third opening 20 covered with transparent material which serves as a window for viewing the adjustment of certain of the contacts. Within the casing and spaced from the walls thereof, there is supported by four bolts and spacing sleeves 22, a rectangular sheet of insulating material 21 on the front side of which there is riveted resilient conducting springs 23, 24 and 25. The springs 23 and 25 are wired to terminals 26 and 27 insulatedly mounted in holes in the bottom of the casing, and conducting strip 28 also riveted on the front of the insulating strip for engagement with springs 23 or 24 whenever either of these springs is depressed, has its lower end connected to a third terminal 29 also insulatedly mounted in a hole in the bottom of the casing. The upper end of the conducting strip 28 is connected by similar conducting strip 30 to a bolt 31 of conducting material extending through the insulating strip 21 and on the opposite end of this bolt there is mounted a bimetallic thermostat strip 32 extending in a plane at right angles to the rear side of the strip 21. The free end of the thermostat strip 32 is thus supported adjacent window 20 between the ends of set screws 33 and 34 adjustably mounted in the terminals 26 and 27 respectively. The terminals 26, 27 and 29 are connected to corresponding conductors designated On, T and Off in the circuit diagram of Fig. 1.

As best shown in Fig. 4 the thermostat strip 32 tends to move against the set screw 33 mounted in the terminal 26 and thereby closes a circuit for opening the electromagnetic valve 13 to turn on the gas supply. In this manner when the temperature of the water in the tank drops to a predetermined degree the thermostat starts the heater in operation and in this manner any desired predetermined amount of hot water may be maintained in the storage tank. When the desired amount of water has been heated, the thermostat strip 32 moves into engagement with the set screw 34 which closes a circuit to cause the valve to be closed, thereby extinguishing the heater. In the event that it is not desired to have the thermostat automatically start the heater when the water in the tank reaches a certain temperature, the set screw 33 may be moved out of engagement with the strip 32 or may even be omitted entirely. Suitable openings in the side of the casing 17 permits the set screws 33 and 34 to be adjusted relative to the strip 32 and the degree of adjustment may be viewed through the window 20.

While the present invention has been disclosed in hot water heating systems utilizing gas as the source of heat, it will be understood that it is likewise applicable to a system wherein electric energy is the source of heat. In such a system it is merely necessary to replace the gas burner by an electrically heated unit and the electromagnetic valve 13 is replaced by an electromagnetic switch for turning on and off the supply of electric current. The operating portion of this switch and the circuits for controlling the same are identical with those shown in Fig. 1.

It will thus be seen that by the switch structure of the present invention the amount of equipment and the wiring in an installation is simplified and rendered less expensive.

What I claim, is:

1. In a device of the class described a flat casing open at the back, a sheet of insulating material mounted within and in spaced relation to the front of said casing, manually controlled contact springs mounted in the space between said casing and said sheet of insulating material, a thermally controlled spring mounted on the opposite side of said sheet of insulating material, terminals mounted in one side of said casing, and electrical connections between said contact springs, said thermal spring and said terminals.

2. In a device of the class described, a flat casing open at the back, a sheet of insulating material mounted within and in spaced relation to the surface of said casing, manually controlled contacts mounted in the space between said casing and said sheet of insulating material, a thermally controlled spring mounted on the opposite side of said sheet of insulating material, terminals mounted in one side of said casing, and electrical connections between said contact springs, said thermally controlled spring and said terminals, and a contact mounted on one of said terminals in operative relation to said thermally controlled spring.

In witness whereof, I hereunto subscribe my name this 31st day of October, A. D. 1927.

GEO. C. HUNT.